United States Patent [19]

Izbicki

[11] 4,207,380

[45] Jun. 10, 1980

[54] ALUMINUM THERMOSTAT METAL

[75] Inventor: Anthony J. Izbicki, Reading, Pa.

[73] Assignee: Hood & Company, Inc., Hamburg, Pa.

[21] Appl. No.: 925,435

[22] Filed: Jul. 17, 1978

[51] Int. Cl.² .................. B32B 7/02; B32B 15/04; B32B 15/20

[52] U.S. Cl. .................. 428/616; 428/618; 428/653; 428/654

[58] Field of Search ............... 428/616, 617, 618, 607, 428/653, 654

[56] References Cited

U.S. PATENT DOCUMENTS

| | | | |
|---|---|---|---|
| 3,782,908 | 1/1974 | White | 428/616 |
| 3,994,695 | 11/1976 | Setzer et al. | 428/654 |
| 4,093,782 | 6/1978 | Anthony et al. | 428/654 |

FOREIGN PATENT DOCUMENTS

| | | | |
|---|---|---|---|
| 160847 | 3/1953 | Australia | 428/616 |
| 892213 | 3/1944 | France | 428/616 |
| 235079 | 3/1945 | Switzerland | 428/616 |
| 907928 | 10/1962 | United Kingdom | 428/616 |
| 927620 | 5/1963 | United Kingdom | 428/618 |

OTHER PUBLICATIONS

"Registration Record of Aluminum Association Alloy Designations and Chemical Compositional Limits for Wrought Aluminum Alloys", 9/76; pp. 2-10.

Primary Examiner—L. Dewayne Rutledge
Assistant Examiner—W. G. Saba

[57] ABSTRACT

A composite thermostat metal (bimetal) is disclosed in which a layer of strain hardenable aluminum is bonded to a layer of metal of relatively low coefficient of thermal expansion.

4 Claims, No Drawings

ALUMINUM THERMOSTAT METAL

BACKGROUND OF THE INVENTION

1. Field of the Invention

This invention relates to a composite thermostat metal (bimetal) and more particularly to a composite thermostat metal that is made using aluminum as one of the metal layers.

2. Description of the Prior Art

Composite thermostat metals are made of metallurgically bonded layers of metals having relatively high and relatively low coefficients of thermal expansion. When the thermostat metals are subjected to temperature changes the differences in the thermal expansion of these layer materials give rise to stresses in the thermostat metal components that are relieved by the flexing of the bimetal. This flexing or bending is utilized in various conventional ways to actuate controls or the like in response to a temperature change. The amount of flexing which occurs in the thermostat metal in response to a temperature change is referred to as the "flexivity" of the thermostat metal and the flexivity of a given thermostat metal depends on the difference between the thermal expansion properties of the several metals of the composite thermostat metal. To acheive high flexivities, special metal alloys are employed which have either a relatively high or a relatively low coefficient of thermal expansion. These alloys are often expensive and difficult to process so that high flexivity thermostat metals can be of high cost.

To reduce the cost of thermostat metals, it has been proposed to use aluminum as the high expansive element. Aluminum combines a number of useful properties including the fact that it is inexpensive and its low density permits a substantial increase in the number of parts that can be produced per unit weight. Both of these factors reduce the cost of the thermostat metal. Aluminum is also advantageous for use as a thermostat metal since it has a high coefficient of thermal expansion which provides flexivity to the composite bimetal. The thermal and electrical conductivity of aluminum are both high which is useful when rapid thermal response and high sensitivity are desired. The prior art, as typified by U.S. Pat. No. 3,782,908, recognizes the value of aluminum as a thermostat metal but points out inherent deficiencies of aluminum for this application since aluminum is not a high strength metal and its yield strength may be exceeded, particularly at elevated temperatures. In accordance with the referenced patent heat treatable aluminum alloys should be selected for use that can be tempered to provide yield strengths in the order of 30,000 psi at temperatures up to about 350° F.

While these aluminum alloys function well as components for bimetals, they have not been widely used since they are difficult and expensive to process in conventional manufacturing methods. The problem is that these aluminum alloys acquire a temper during processing and the composite formed by cold rolling under extremely high pressure to form a bond must be annealed before cold rolling to a useable finished gauge. The cold rolling required to reach finished guage, for example, requires periodic annealing between successive pass sequences. This annealing adds considerably to the manufacturing costs if critical quenching must be included as a manufacturing step as with heat treatable aluminums. The critical heat treat cycle needed to develop the properties of a heat treatable alloy also, in itself, adds to the manufacturing costs. The results is that even though aluminum has many advantageous properties and can materially reduce the cost of thermostat metals, many of these advantages are offset by the additional processing attention that must be given to the aluminum alloys.

Accordingly, it is an object of this invention to utilize aluminum, other than critical temper heat treating aluminum alloys, as a component of a bimetal.

Another object of this invention is to provide a bimetal useful at temperatures up to about 350° F. that utilizes aluminum as the high thermal expansive component.

Another object of this invention is to make relatively inexpensive bimetals that have a high flexivity and high thermal and electrical conductivity.

Briefly, these and other objects of this invention are achieved by using strain hardenable aluminum in an amount of over 50% by volume of the bimetal. By these means annealing is avoided and required strength is provided. For example, aluminum that is substantially pure is useful in the practice of this invention since it will not temper during the heat treating and annealing of the bimetal. It is true that the strain hardenable aluminums will develop some hardness during the rolling operation, but this is of no serious consequence since these aluminums are easily returned to their original softness by heating them at a predetermined temperature for an effective length of time. This is in contrast to the close process controls over heating and cooling cycles that are required to anneal tempered aluminum.

Sufficient strength exceeding the yield strength of the aluminum is achieved by using at least 50% by volume aluminum and preferrably much more, such as, for example, 80%. It can be understood that a higher percentage of aluminum in the bimetal will provide economy since an increase in the number of parts per pound will be obtained. The parts will also be cheaper because of the relatively inexpensiveness of the aluminum as compared with more conventional bimetal alloys. Desirable electrical and thermal conductivity are also obtained, which will result in faster response to changes in temperature and the product will tend to be more reliably consistant in its mechanical and physical properties than will be a heat treatable aluminum alloy that has been through several annealing cycles. Finally, as an added bonus, the strain hardenable aluminums of this invention are easily bonded to other thermostat metals such as Invar.

EXAMPLE

A composition of 80 volume percent 1100 Aluminum and 20 volume percent Invar (an Alloy of 36% Nickel balance iron) was bonded using cold bonding techniques as are known to those skilled in the art and subsequently strain annealed at 900° F. using standard techniques. Subsequent to this the Alloy was further cold rolled to 40% reduction. The composit thermostat bimetal had the following properties.

| | |
|---|---|
| Flexivity (100° F. to 300° F. astm B106) | $150 \times 10^{-7}$ |
| Electrical Resistivity (Ohms 75° F. cmf) | 25 |
| Elastic modulus (psi) | $13 \times 10^6$ |
| Density (lbs/cu.ft.) | .137 |
| Thermal Conductivity (BTU in/ft$^2$ hr °F.) | transverse 306 longitudinal 1260 |

By comparison a thermostat metal composed of 50 volume percent 2024 heat treatable aluminum hardened to T3 temper and 50 volume percent Invar will have the following properties.

| | |
|---|---|
| Flexivity | $180 \times 10^{-7}$ |
| Density | .195 |
| Thermal Conductivity (BTU in/ft$^2$ hr °F.) | Transverse 135 |
| | Longitudinal 493 |

From the foregoing it can be seen that if the aluminum is present in the amount of 50 volume percent, the density is 0.195. Since, in accordance with this invention, it is preferred that the aluminum be present in a greater amount than this, the thermostat metal can be defined as having a density less than about 0.19 lbs./cu. ft.

I claim:

1. A bimetal characterized in that the high thermal expansive metal is a strain hardenable aluminum having a minimum purity of at least 99% and being present in an amount above about 50 volume percent.

2. A bimetal according to claim 1 wherein the aluminum is 1100 aluminum.

3. A bimetal according to claim 1 wherein the aluminum is present in an amount from about 60 to about 80 volume percent.

4. A bimetal according to claim 1 having a density of less than 0.19 pounds per cubic inch.

* * * * *